(12) United States Patent
Pickett (10) Patent No.: US 9,736,375 B1
(45) Date of Patent: Aug. 15, 2017

(54) SYSTEM AND METHOD FOR STABILIZING A DATA STREAM FROM AN IN-FLIGHT OBJECT

(71) Applicant: Joshua R&D Technologies, LLC, Plano, TX (US)

(72) Inventor: David Pickett, Plano, TX (US)

(73) Assignee: Joshua R&D Technologies, LLC, Plano, TX (US)

(\*) Notice: Subject to any disclaimer, the term of this patent is extended or adjusted under 35 U.S.C. 154(b) by 0 days.

(21) Appl. No.: 15/044,793

(22) Filed: Feb. 16, 2016

(51) Int. Cl.
*H04N 5/228* (2006.01)
*H04N 5/232* (2006.01)
*G06T 7/20* (2017.01)

(52) U.S. Cl.
CPC ........... *H04N 5/23267* (2013.01); *G06T 7/20* (2013.01); *H04N 5/23238* (2013.01); *G06T 2207/30224* (2013.01); *G06T 2207/30241* (2013.01)

(58) Field of Classification Search
CPC .. H04N 5/23267; H04N 5/23238; G06T 7/20; G06T 2207/30241; G06T 2207/30224
USPC ... 348/82, 143, 144, 151, 158, 208.4, 208.6, 348/373–376
See application file for complete search history.

(56) References Cited

U.S. PATENT DOCUMENTS

| | | | |
|---|---|---|---|
| 2004/0036770 A1* | 2/2004 | Adams | H04N 7/183 348/157 |
| 2009/0040308 A1* | 2/2009 | Temovskiy | F41G 3/16 348/158 |

\* cited by examiner

*Primary Examiner* — Yogesh Aggarwal
(74) *Attorney, Agent, or Firm* — Kirby B. Drake; Klemchuk LLP (57) ABSTRACT

A system and a method for stabilizing a data stream from an in-flight object may provide at least one video camera that may be embedded in the object. A data stream of the at least one video camera may be processed and produce an output video that may be stabilized and configured for broadcasting an action. The output video may provide an orientation that may provide an accurate view of the action. An object imaging system may be provided to receive the data stream from the at least one video camera, and a video processing server may be provided to process the data stream. The object imaging system may provide a wide angular field of view that may provide clear images for the output video.

15 Claims, 5 Drawing Sheets

SYSTEM AND METHOD FOR STABILIZING A DATA STREAM FROM AN IN-FLIGHT OBJECT

TECHNICAL FIELD

The present disclosure generally relates to image processing, video stabilization, and video regeneration. More specifically, the present disclosure relates to stabilizing a data stream of at least one video camera embedded in an in-flight object.

BACKGROUND

Many events, such as sporting events, are broadcast live and aim to provide viewers with a real-time or live view of the event. However, fast-moving objects can present challenges to quickly capturing accurate views of a live event due to disoriented footage that can require manipulation in order to produce properly oriented video output streams. In particular, capturing a live sporting event, such as a football game, may present challenges to quickly processing data streams of the live event due to the rotational velocity and spiral movement of the ball. As such, a time delay can result from an attempt to manipulate footage to create video output streams that can provide useful views of the event.

SUMMARY

Embodiments of the present disclosure generally provide a method of stabilizing a data stream from an in-flight object throughout a trajectory of the object. The method may provide receiving the data stream of an action in an object imaging system from the at least one video camera that may be embedded in the object. The data stream may include at least video data, focal plane array (FPA) data, and inertial navigation system (INS) data. At least one transceiver may relay information to the object imaging system. The method may further provide processing the data stream in a video processing server (VPS), and a video processing application (VPA) may orient the data stream with respect to a reference location. The method may provide regenerating the data stream in the VPS, stabilizing and configuring an output video that may be configured for broadcasting the action in a proper orientation. The method may provide at least one video camera that may be a high-speed device capable of capturing travel of fast-moving objects. The method may provide the object imaging system including a wide angular field of view of approximately 88 degrees. The method may further provide that the object imaging system is a football imaging system that provides a real-time or a near real-time data stream of the action. The action may include at least a portion of a football game. Processing the data stream may be performed by buffering the data stream; filtering the INS data; determining deviations between a plurality of positions of the object, the reference location, and at least one projection plane location; and rotating a normalized pixel corner matrix of the at least one video camera about a bore sight axis of the at least one video camera. Rotating the normalized pixel corner matrix may provide a graphics processing unit or a field programmable gate array that may calculate a set of rotation matrix data. The method may further provide projecting a plurality of FPA frames onto the at least one projection plane location, applying at least one pixel to the at least one projection plane location, and aligning and adjusting the plurality of FPA frames. The reference location may be a centroid of a predetermined number of frames and/or approximately 30 frames. The normalized pixel corner matrix may be rotated within approximately five milliseconds. Filtering may be formed by synchronizing the INS data and the FPA data. The method may provide compressing frames of lossless compressed video relative to the synchronized INS data and FPA data.

Embodiments of the present disclosure generally provide a system for stabilizing a data stream from an in-flight object throughout a trajectory of the object. The system may include at least one video camera that may be embedded in the object. An object imaging system may be provided to receive a data stream from the at least one video camera of an action. The data stream may include at least video data, focal plane array (FPA) data, and inertial navigation system (INS) data. The system may include at least one transceiver that may be provided to relay information to the object imaging system. The system may include a video processing server (VPS) that may be provided to process and regenerate the data stream. The system may include a video processing application (VPA) that may orient the data stream with respect to a reference location. An output video may be stabilized and configured for broadcasting the action in a proper orientation. The object imaging system may be a football imaging system that may provide a real-time or a near real-time data stream of the action. The action may include at least a portion of a football game. Further, the object imaging system may include a battery that may be configured to support broadcasting the output video throughout a time period of the action. The system may include a graphics processing unit or a field programmable gate array that may calculate a set of rotation matrix data and may rotate a normalized pixel corner matrix of the at least one video camera about a bore sight axis of the at least one video camera. The system may provide that the at least one video camera may be a high-speed device capable of capturing travel of fast-moving objects. The reference location may be a centroid of a predetermined number of frames. The object imaging system may have a wide angular field of view of approximately 88 degrees.

The foregoing summary is only intended to provide a brief introduction to selected features that are described in greater detail below in the detailed description. Other technical features may be readily apparent to one skilled in the art from the following drawings, descriptions and claims. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

The present disclosure generally provides a system and a method for stabilizing a data stream from an in-flight object throughout a trajectory of the object.

Figure 1:
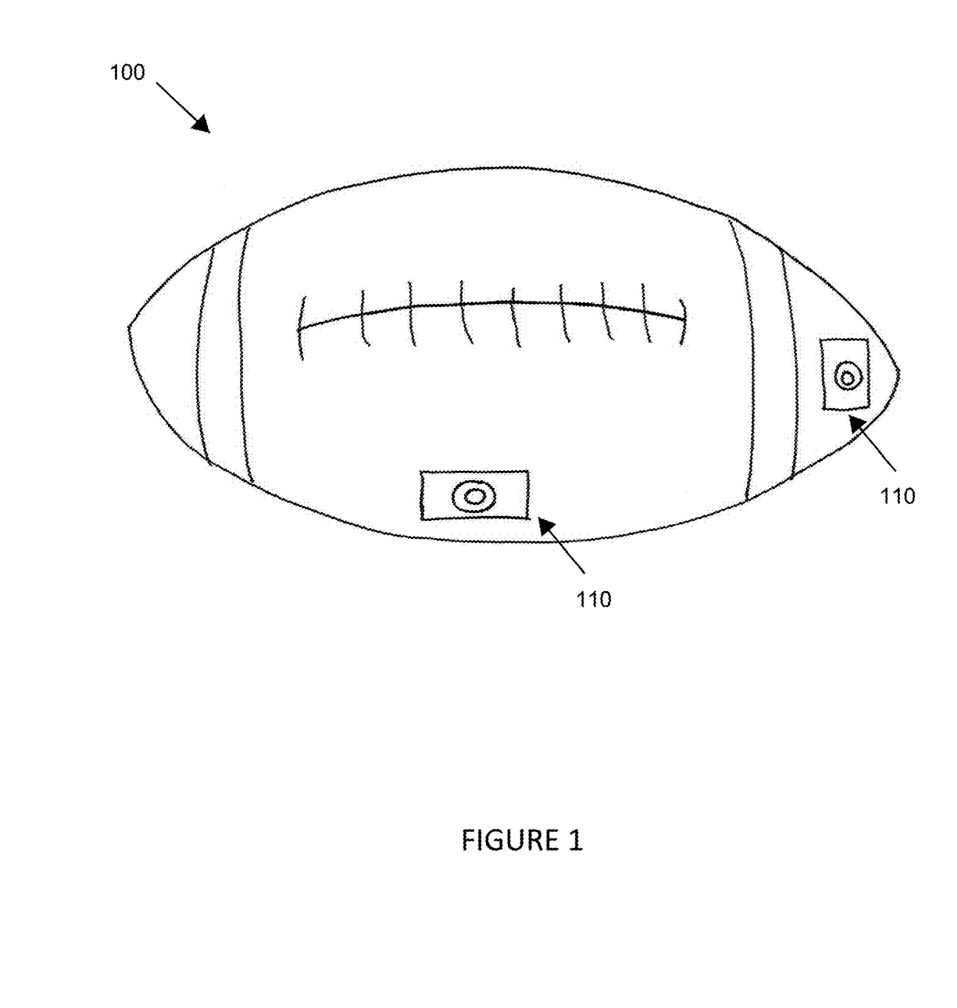
FIG. 1 depicts an object including at least one video camera according to an embodiment of the present disclosure.

According to an embodiment of the present disclosure, as depicted in FIG. 1, a system and method for stabilizing a data stream of an in-flight object throughout a trajectory of the object may provide at least one video camera 110 that may be embedded and secured within in-flight object 100. As object 100 travels during a flight event, at least one video camera 110 may stream video of a flight path of the trajectory of object 100. At least one video camera 110 may be a high-speed device that may capture travel or the flight path of object 100. It should be appreciated that at least one video camera 110 may capture travel or the flight path of fast-moving objects without departing from the present disclosure. It should be appreciated that object 100 may be a football without departing from the present disclosure. It should be appreciated that at least one video camera 110 may be provided in a plurality of locations within an interior of object 100 and may provide a plurality of views of a flight path of object 100 including, but not limited to, a front view of the flight path and a rear view of the flight path. It should further be appreciated that a plurality of video cameras may be provided within object 100 without departing from the present disclosure. It should also be appreciated that at least one video camera 110 may be appropriately sized to fit within object 100. It should be appreciated that objects other than or in addition to video camera 110 may be placed into object 100 including, but not limited to, microphones and sensors. It should further be appreciated that sensors may detect a plurality of conditions of object 100 including, but not limited to, acceleration, speed, height, rotation, and angles of the object 100.

According to an embodiment of the present disclosure, at least one video camera 110 may be provided to focus incoming light rays onto a sensing array that may be a focal plane array (FPA) (not shown). It should be appreciated that a plurality of FPA types may be used for at least one video camera 110 and may provide various levels of performance characteristics that may affect an image quality of output video. It should be appreciated that FPA types may include, but are not limited to, charge-coupled devices (CCD) and complementary metal-oxide semiconductors (CMOS). It should further be appreciated that various levels of performance characteristics of FPA types may include, but are not limited to, horizontal and vertical resolution, pixel pitch, frame rate, sensitivity, and pixel size.

Figure 2:
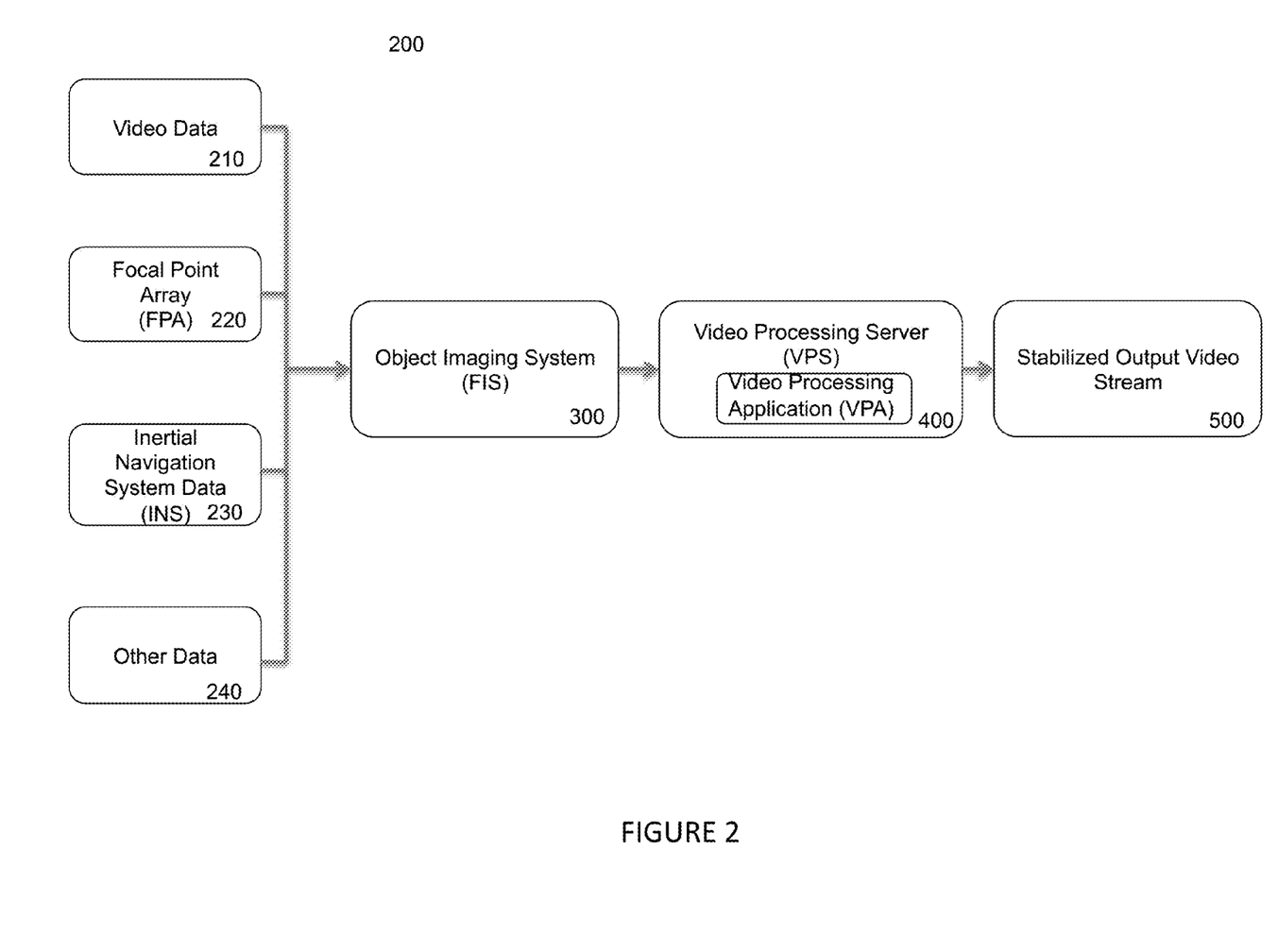
FIG. 2 depicts a system and method for stabilizing a data stream from an in-flight object according to an embodiment of the present disclosure.
Figure 3:
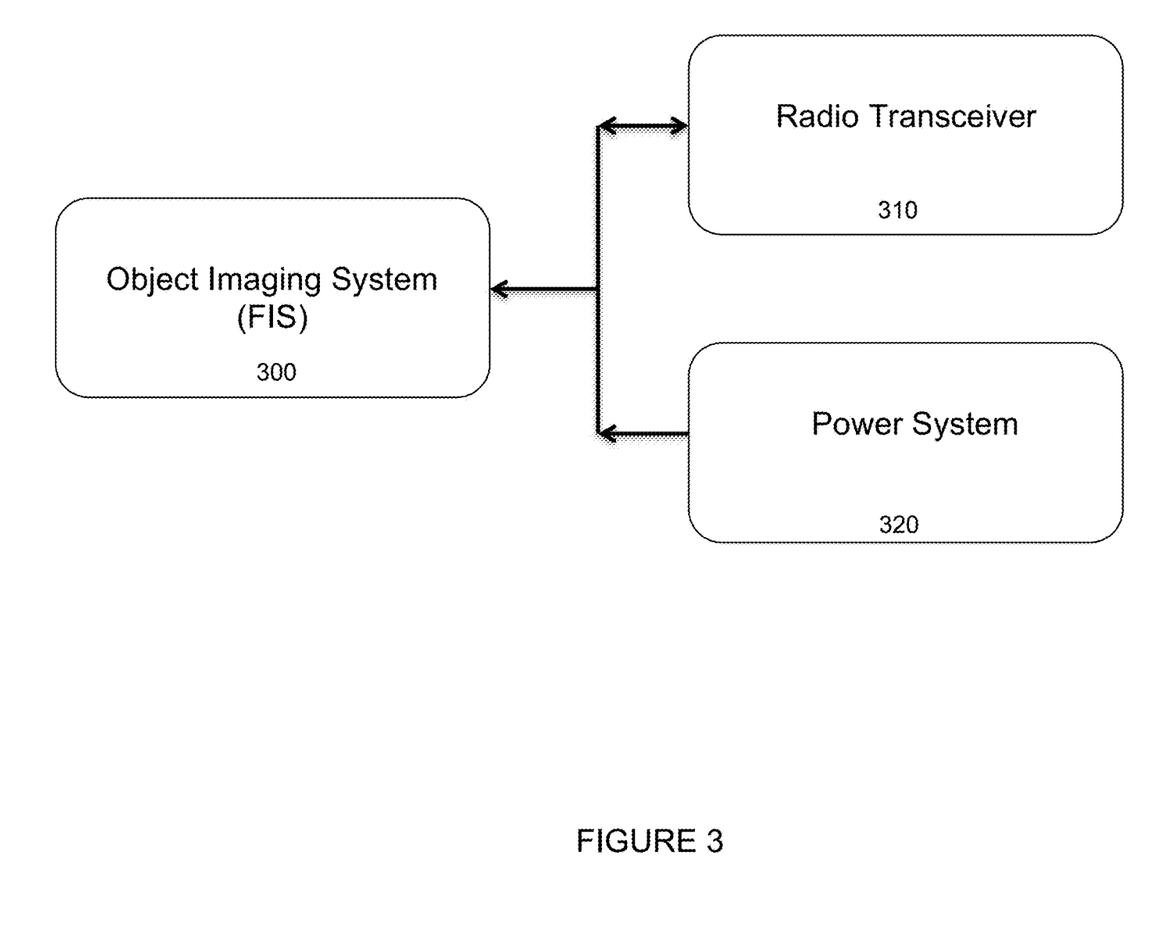
FIG. 3 depicts an object imaging system according to an embodiment of the present disclosure.

According to an embodiment of the present disclosure, intrinsic parameters of at least one video camera 110 may be utilized by an image processing application in order to achieve a flat field FPA image and may nullify negative effects of the lens that may degrade image quality. It should be appreciated that intrinsic parameters of at least one video camera 110 may include, but are not limited to, focal length, a center of a projection, and radial lens distortion. It should further be appreciated that intrinsic parameters may be specific to a camera and/or lens configuration. It should also be appreciated that intrinsic parameters may be stored onboard object imaging system (FIS) 300 (FIG. 2 and FIG. 3). At least one video camera 110 may be calibrated based on intrinsic parameters and may utilize a "chess board" calibration procedure. It should be appreciated that the "chess board" calibration procedure may provide the advantage of a simple calibration structure that may be easy to construct. It should be appreciated that other calibration procedures may be utilized without departing from the present disclosure.

According to an embodiment of the present disclosure, selection of a particular lens may provide a horizontal and a vertical field of view (FoV). In an embodiment of the present disclosure, the lens may provide a 1/3.06-inch OV13850 sensor type that may be available from Omni Vision to support an active array of 4224×3136 pixels (13.2-megapixels) that may operate at 30 frames per second (fps); however, a different size or type of sensor having a differing pixilation may be used without departing from the present disclosure. It should further be appreciated that suitable lenses may be available from companies including, but not limited to, Sony®, ON Semiconductor®, and Google®; however, other lenses may be used without departing from the present disclosure. The FoV may critically impact image processing. For example, a large or wide FoV may provide greater coverage of an image with a greater non-linear distortion and a degraded image resolution. However, a narrow FoV may provide an image quality that may quickly change by becoming blurry or out of context depending on a depth of field. It should be appreciated that the lens of video camera 110 may have a hyperfocal distance that may only be approximately one meter away; thus, a wide FoV may provide objects greater than approximately one meter away from video camera 110 to be in-focus. It should be appreciated that FIS 300 (FIG. 2 and FIG. 3), as further described below, may provide a wide FoV of approximately 88°. It should be appreciated that a wide FoV may provide a clear and comprehensive video output stream of a live event.

According to an embodiment of the present disclosure, as depicted in FIG. 2, the system and method for stabilizing a data stream of object 100 may provide two subsystems that may include FIS 300 and video processing server (VPS) 400. FIS 300 may receive a data stream that may include at least video data (210), focal point array (FPA) data (220), inertial navigation system (INS) data (230), and other types of data (240). It should be appreciated that video data 210 may include, but is not limited to, a high definition video stream; however, other types of video data may be provided in addition to or in place of a high definition video stream without departing from the present disclosure. It should be appreciated that other types of data 240 may include, but are not limited to, object position, object orientation, a velocity of the object, and an acceleration of the object. It should further be appreciated that FIS 300 may be a football imaging system in an embodiment of the present disclosure. It should also be appreciated that FIS 300 may be an imaging system for objects including, but not limited to, basketballs, tennis balls, baseballs, volleyballs, and other types of objects that may be in motion, such as, a cap worn by a runner during a race and goggles worn by a swimmer during a swimming competition without departing from the present disclosure.

According to an embodiment of the present disclosure, as depicted in FIG. 2, VPS 400 may provide a workstation computer server that may receive one or more streams of data, including but not limited to, a stream of high definition video data and an object position, orientation, velocity and/or acceleration of the object. VPS 400 may utilize various image processing techniques that may include regenerating and stabilizing video to produce stabilized output video stream 500 and live broadcasting stabilized output video stream 500 to viewers, such as television viewers, officials or referees. Stabilizing output video stream 500 may include properly orienting the data stream. For example, a video camera may be embedded in an object, and the object may rotate to multiple positions while recording/streaming footage of an action or a live event, whether in whole or in part. The recorded/streamed footage may provide multiple orientations of action occurring during a live event, such as, upright and upside down, that a viewer may find disorienting. As such, the captured footage including a plurality of frames may require stabilization and proper orientation in order to provide viewers with an accurate representation of the action or the live event. Stabilizing output video stream 500 may also include regenerating a close-up view of an event including, but not limited to, a football game or a play during a football game. It should be appreciated that a close-up view may provide an enhanced view of object 100 and/or items surrounding object 100 including, but not limited to, viewing a football in a player's hands in actual size, as opposed to a view that is "zoomed out" from the football.

According to embodiments of the present disclosure, VPS 400 may provide a high-end multi-core computer workstation that may include one or more ports for receiving a graphics processing unit (GPU) card, such as an NVidia Quadro or a Tesla GPU card, and/or an FPGA processing engine, such as a Xilinx ZC706 processing engine. A GPU card may provide the system with increased capability to quickly perform simple and parallel linear calculations of a Euler rotation matrix or a set of rotation matrix data, as further described below, and render graphics that may be utilized in regenerating a data stream. A FPGA processing engine may provide deep pipelined and parallel processing independent of control of a processor. It should be appreciated that VPS 400 may operate with any type of operating system. It should further be appreciated that VPS 400 may be developed on an Ubuntu distribution release of a Linux OS.

According to embodiments of the present disclosure, VPS 400 may include one or more video output interfaces that may provide video output in a format that may be desired by a broadcasting entity. When referring to a "broadcasting entity," it should be appreciated that this may be a television station, a sports league, or other specified persons/entities. It should be appreciated that a workstation may be customized to the needs of the broadcasting entity. For example, a video stream may be adapted by exporting the stream by HDMI or SDI interfaces, changing the output video resolution, and/or changing the frame rate. In an embodiment of the present disclosure, an MPEG-4 video file may be produced and played back on a personal computer. It should further be appreciated that VPS 400 may process a data stream directly from video camera 110 via an HDMI port in some embodiments of the present disclosure. It should be appreciated that the system and method for stabilizing a data stream according to embodiments of the present disclosure may incorporate a simple HDMI connector that may be connected to an HD monitor for video playback, illustration, and diagnostics; however, other similar types of connectors and monitors may be utilized without departing from the present disclosure.

According to embodiments of the present disclosure, VPA 400 may orient the data stream with a common datum, so that a resulting video stream may provide a quality image. Frames of lossless compressed video may be processed relative to synchronized INS data and calibration data of at least one video camera 110. It should be appreciated that the system and method for stabilizing the data stream may finely adjust video based upon an optical flow of discrete objects in frames that may precede and follow a current processed frame. It should be appreciated that frames may be transmitted using only lossless compression that may result from a time sensitivity of pixels provided on the FPA relative to INS data 230 in some embodiments of the present disclosure; however, other forms of compression may be utilized without departing from the present disclosure.

It should be appreciated that the system and method of stabilizing a data stream may utilize post-processed data or data that has already been decoded. It should further be appreciated that data may be processed in real-time or near real-time, such as at a frame rate, and may provide an expected latency between transmission from the FIS and the VPA to retransmit the processed data between approximately two and three seconds in some embodiments of the present disclosure.

According to an embodiment of the present disclosure, the system and method for stabilizing a data stream may determine at least a relative position, orientation, velocity, and acceleration using FIS 300 and may stabilize an image that may be provided with FPA data 220. It should be appreciated that a micro-electro-mechanical system (MEM) may be based on inertial navigation system (INS) data 230 and may be utilized to stabilize an image that may be received with FPA data 220. INS data 230 may provide platform attitude information that may include, but is not limited to, a 3-dimensional orientation that may include yaw, pitch, and roll; a 3-dimensional position that may include x, y, and z coordinates; a linear velocity and acceleration; and an angular velocity and acceleration. INS data 230 may provide platform measurements at a rate that may be approximately six times a rate of imaging frame data; however, the rate may be more or less without departing from the present disclosure. In an embodiment of the present disclosure, INS platform measurements may provide a rate of 400 Hz, while imaging frame data may provide a rate of 60 Hz. INS data 230 may provide information about time frames in which an action has occurred or is expected to occur, such as, indicating that the flight time of object 100 that may be less than 30 seconds. It should be appreciated that Kalman filtering of the INS attitude solution may provide high-frequency vibration filtering that may help smooth out changes in attitude and may converge onto an image processing solution. Other INS solutions, such as an analog device like ADXL 345 that may include accelerometers that provide 6 degrees of freedom (DoF), may provide a high rotation rate and data regarding an attitude of object 100.

According to an embodiment of the present disclosure, an FIS system controller may be an embedded system. It may control a collection of FPA data 220 and INS data 230, and it may relay the collection of data in one or more streams of data via at least one radio transceiver 310. The FIS system controller may be provided to respond to data requests that may be received from VPS 400 and to collect data. It should be appreciated that image processing may not take place on the FIS system controller, and as such, the FIS system controller may be a simple device with elemental functions in some embodiments of the present disclosure. It should also be appreciated that image data may be collected and synchronized to INS data 230. All data that may be received about a flight path of object 100 may be collected, and a Huffyuv lossless video compression algorithm may be utilized to compress all data that may be sent to VPS 400. It should be appreciated that an onboard DDR3 SDRAM may be provided to store video and INS streams and may allow for throttling data over a plurality of transceiver links. It should further be appreciated that sufficient memory may be provided onboard FIS 300 so that information about the flight path of object 100 may be stored and later retrieved via a local physical interface, such as a universal serial bus (USB) and/or an Ethernet, even if a data communications transceiver may be unable to communicate with VPS 400.

In an embodiment of the present disclosure, as depicted in FIG. 3, radio transceiver 310 in communication with FIS 300 may be a wireless local-area network (WLAN) radio transceiver. Radio transceiver 310 may utilize a protocol system, such as an IEEE 802.11n or 802.11ac protocol, that may provide a data rate of approximately 150 Mb/s to over 1 Gb/s per stream and may provide up to approximately four allowable streams. It should be appreciated that a transmission range of a band of the IEEE 802.11n and/or 802.11ac protocol may provide up to approximately 820 feet and may be sufficient to operate FIS 300; however, there may be bands used that may increase or decrease the transmission range but still be sufficient to operate FIS 300 without departing from the present disclosure.

In an embodiment of the present disclosure, as depicted in FIG. 3, power system 320 in communication with FIS 300 may include a battery that may have built-in short circuit cell protection and/or a power controller. The battery provided as part of power system 320 may enable FIS 300 to broadcast real-time or live video throughout the duration of an event, such as a football game, without running out of power. In an embodiment of the present disclosure, the battery may be a lithium ion battery; however, other types of batteries may be utilized without departing from the present disclosure. It should be appreciated that the power controller may enable the battery to be charged and may regulate power rails for various components of power system 320, such as, a plurality of transceiver links and an FIS system controller. It should further be appreciated that power rails may provide power outputs including, but not limited to, 3.3 volts direct current (VDC), 5 VDC, 1.8 VDC, and 0.9 VDC.

Figure 4:
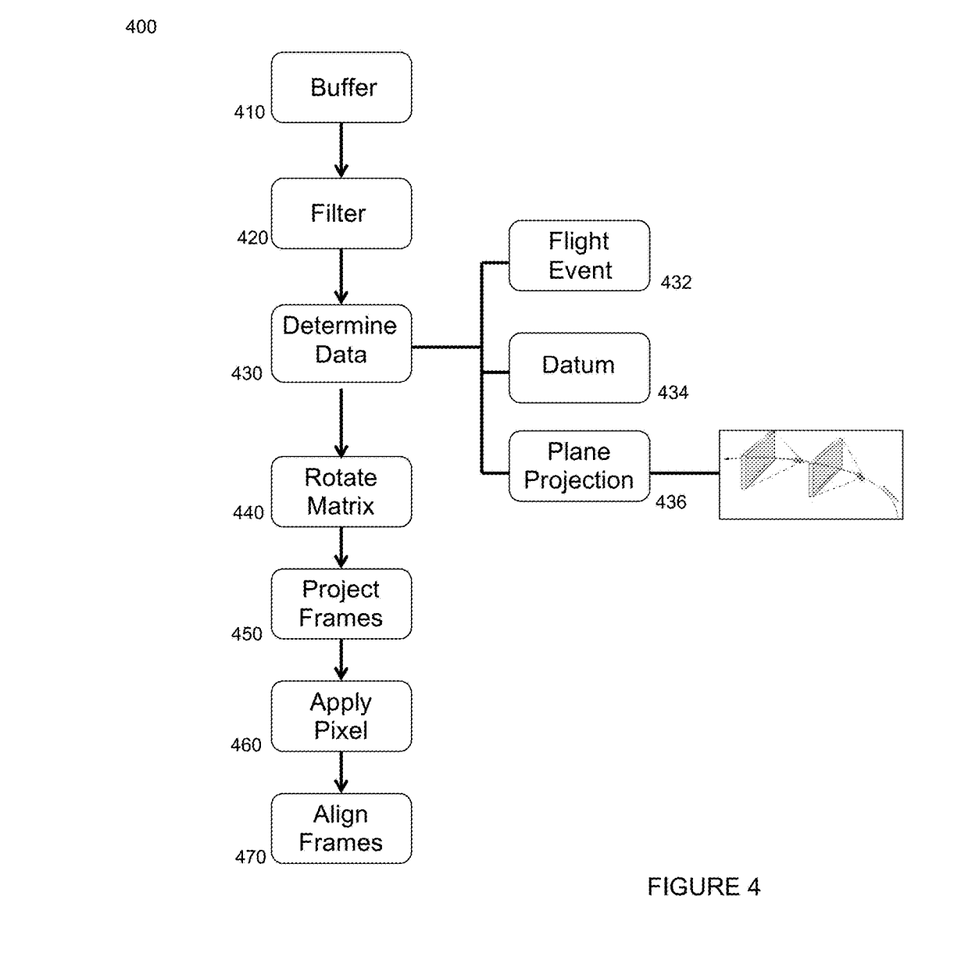
FIG. 4 depicts a system and method for processing a data stream according to an embodiment of the present disclosure.

According to an embodiment of the present disclosure, as depicted in FIG. 4, processing an incoming data stream may include all or a portion of the following steps.
1) Receiving and buffering the data stream (step 410);
2) Filtering INS data (step 420);
3) Determining data that may include deviations between a plurality of positions of an in-flight object, a reference location, and at least one projection plane location (step 430);
4) Rotating a normalized pixel corner matrix of at least one video camera about a bore sight axis of the at least one video camera (step 440);
5) Projecting a plurality of FPA frames onto the at least one projection plane location (step 450);
6) Applying at least one pixel to the at least one projection plane location (step 460); and
7) Aligning and/or adjusting the plurality of FPA frames (step 470).

Each of these steps will be discussed in further detail below.
Receiving and Buffering the Data Stream (Step 410)

According to an embodiment of the present disclosure, as depicted in FIG. 4 (in connection with the system depicted in FIG. 2), the system and method of stabilizing a data stream may collect and transmit data, including but not necessarily limited to, video data 210 and INS data 230 that may be processed by VPA 400. At least video data 210 and INS data 230 may be buffered prior to being processed in step 410. FIS 300 may packetize synchronized image frames, such as video that may be received by an FPA, and may packetize INS data 230 into manageable time-stamped packets in an embodiment of the present disclosure. Video data 210 may be compressed, such as by using Huffyuv lossless compression video codec v2.1; however, other codecs and compression mechanisms may be utilized without departing from the present disclosure. Resulting INS data may or may not be compressed, as the size of the data packet per image frame may be extremely small. It should be appreciated that INS data may be up to approximately 128 bytes and may provide a data rate of approximately 200 kilobits per second (kbps) in embodiments of the present disclosure. VPS 400 may receive data from wireless network transceiver 310 (FIG. 3) and may decompress and align the video and INS frames to be processed. Receiving, buffering, and decompressing data may occur when video data 210 is received from FIS 300. Data may be processed from FIS 300 upon final reception and decompression of the data.

Filtering the INS (Step 420)

According to an embodiment of the present disclosure, as depicted in FIG. 4, the INS onboard FIS 400 may sample data at approximately 500 Hz, while video may be processed at a frame rate of 240 Hz. INS data 230 may be filtered in step 420, and it should be appreciated that oversampling of data may help to eliminate a need to establish a set of INS data that may be time-synchronized to a sampling of FPA data. It should be appreciated that oversampling of data may be provided at a fixed sampling rate of approximately 2.08. It should be appreciated that oversampling of data may be provided at a fixed sampling rate of any size without departing from the present disclosure. It should further be appreciated that a Kalman filter may be utilized to examine the complete trajectory of object 100 during flight. It should further be appreciated that compressed sensing techniques may be used to infer correct data below a Nyquist sampling rate in embodiments of the present disclosure. It should be appreciated that the flight dynamics and/or the attitude of object 100 may be determined by utilizing at least one of yaw, pitch, and roll; a position of the object in free space (i.e., X,Y,Z) relative to starting coordinates (i.e. a first image position); linear velocity and acceleration of the object, and angular velocity and acceleration of the object.

Determining Data (Step 430)

According to an embodiment of the present disclosure, as depicted in FIG. 4, INS data 230 may indicate deviations between a plurality of positions of object 100 during a key flight event, such as, throwing of the object, and these positions may be determined in step 430. It should be appreciated that identifying key flight event 432 may be determined by analyzing the velocity and position of object 100. It should be appreciated that a trigger for identifying flight event 432 may be determined using INS data 230, and the trigger may be set and adjusted as desired. It should be appreciated that a key flight event may be utilized to begin a process of generating datum and plane projections. It should further be appreciated that before a flight event occurs, a video stream associated with object 100 may be viewed and/or rotated, but a proper plane projection may not occur until the key flight event occurs.

According to an embodiment of the present disclosure, after identifying flight event 432, filtered INS data may be used to establish datum 434 for projection planes 436. Establishing datum or geodetic reference location 434 may be based upon the centroid of the first 30 frames that may be captured before the flight event occurs; however, it may be based on more or fewer frames without departing from the present disclosure. Datum 434 may establish a relative geo-location of the object.

According to an embodiment of the present disclosure, after datum 434 is established, INS data 230 may be utilized for each FPA frame location and may determine an optimal projection plane location 436 based upon datum 434. Determining optimal projection plane location 436 may be based upon a course of the centroid of object 100 with the normal vector of a plane that may follow the flight path that may be based upon surrounding neighboring frames. Plane projection 436 may provide an image space in which the FPA image data may be oriented to the image space. Determining optimal projection plane 436 may be critical to a fundamental operation of a smooth video regeneration. It should be appreciated that a plurality of variables may be adjusted that may control the plane projection and may include, but are not limited to, the projection plane size, pixel pitch, and forward distance from the object.

Rotating a Matrix (Step 440)

Figure 5:
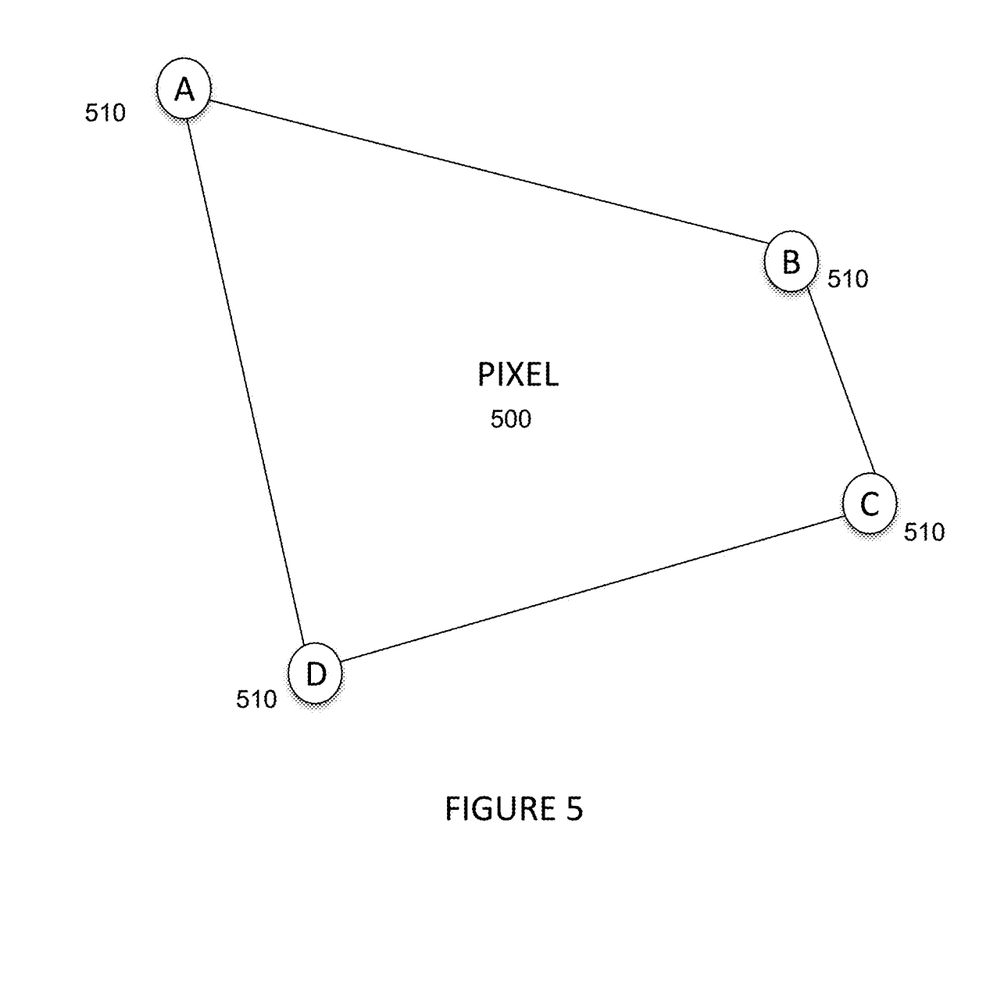
FIG. 5 depicts a pixel including pixel corners according to an embodiment of the present disclosure.

According to an embodiment of the present disclosure, as depicted in FIG. 4, a normalized pixel corner calibration matrix of the FIS camera may be rotated about a bore sight axis of one or more video cameras by the attitude of FIS 300 and the INS platform, and the attitude of the projection plane. A yaw-pitch-roll Euler sequence may be applied to each pixel corner 510 (FIG. 5). The number of sequences calculated may be highly dependent upon a resolution of an image. It should be appreciated that the number of sequences may provide approximately 1920×1080 pixels or 2,076,601 pixel corners in an embodiment of the present disclosure; however, more or fewer pixels may be provided without departing from the present disclosure.

It should be appreciated that a Euler rotation matrix may be calculated utilizing the following equation.

$$\text{Euler} = \begin{bmatrix} \cos(P)*\cos(R) & \cos(P)*\sin(R) & -\sin(P) \\ \sin(Y)|*\sin(R) - \cos(Y)*\sin(R) & \sin(Y)*\sin(P)*\sin(R) + \cos(Y)*\cos(R) & \sin(Y)*\cos(P) \\ \cos(Y)*\sin(P) + \sin(Y)*\sin(R) & \cos(Y)*\sin(P)*\sin(R) - \sin(Y)*\cos(R) & \cos(Y)*\cos(P) \end{bmatrix}$$

It should be appreciated that where the rotated pixel corners are located in space, new coordinates may be determined utilizing the following equation:

$$\begin{bmatrix} x \\ y \\ z \end{bmatrix} = \begin{bmatrix} \text{Normalized } Pcorner_x \\ \text{Normalized } Pcorner_y \\ \text{Normalized } Pconer_y \end{bmatrix} \times \text{Euler}$$

It should be appreciated that calculating the Euler rotation matrix may be performed for every pixel corner 510 (FIG. 5) that may be provided in an array. To perform calculations of a set of rotation matrix data, a powerful graphics processing unit (GPU) may be provided, such as a NVidia Tesla K series, or a field programmable gate array (FPGA), such as a Xilinx Zynq 7000 series. It should be appreciated that a high performance GPU may provide processing power that may be measured in billions of floating point operations per second (GFLOPS) at 64-bits. It should further be appreciated that a Tesla K series or a Tesla K40 may provide 1680 GFLOPS at 64-bits. The array may be provided on a dedicated FPGA parallel and pipelined processing platform and may rotate the pixel corner matrix in approximately five milliseconds, which may be slightly faster that the frame rate of the FIS camera, which may be approximately 4.2 milliseconds or 240 Hz. It should be appreciated that a faster frame rate may provide greater stabilization to a data stream than a slower frame rate. It should further be appreciated that a throughput of an FPGA in a number of pixels per second that may be processed may be analyzed.

Projecting Frames (Step 450)

According to an embodiment of the present disclosure, as depicted in FIG. 4, a plurality of FPA frames may be projected onto at least one projection plane in step 450. It should be appreciated that the normalized camera calibration matrix may be rotated and oriented by the spatial attitude information that may be provided by the INS system and projection plane attitude angles. It should be appreciated that light field rays of the FPA may be projected onto the projection plane. An INS location may determine the precise intersection coordinates of light rays with the plane in free space. It should be appreciated that there may be various other equations that may take into account the lever arm and geometry that may be associated with the location of the INS system relative to the camera platform. It should be appreciated that orientation offsets may be consistent throughout the processing of the video stream and may be calculated using the following equation.

$P_n = $ Postion on Projection Plane (center point)

$P_0 = $ Position of *FPA* Center (starting point of ray)

$V = $ Director Vector of Light Ray $N = $ Normal Vector of Projection Plane $P = $ Point Intersection Matrix $(x, y, z)$ $$t = \frac{(P_n - P_0)^T \times N}{N^T \times V}$$

$$P = P_0 + (t \times V)$$

It should be appreciated that the location of the INS system may be quickly calculated for each and every pixel corner in the array. It should be appreciated that the array on a dedicated FGPA parallel and pipelined processing platform may rotate the pixel corner matrix in approximately five milliseconds, which may be below a frame rate associated with incoming frames.

Applying a Pixel (Step 460)

According to an embodiment of the present disclosure, as depicted in FIG. 4, at least one pixel 500 (FIG. 5) may be applied to at least one projection plane location in step 460. It should be appreciated that each pixel corner location 510 (FIG. 5) may be rotated, as opposed to processing the actual image recorded by the video camera. Each pixel corner intersection may be provided in the projection plane and may apply pixel 500 (FIG. 5) to the free space. An ascribed area of pixel 500 may be provided by four pixel corners 510 in an embodiment of the present disclosure. The color of pixel 500 may be applied to the free space utilizing a desired weight over an intersection location. It should be appreciated that pixel 500 may be applied to the free space by calculating an area of the quadrilateral that may be defined by the pixel corners.

It should be appreciated that an area of a quadrilateral may be utilized to calculate the intersection location and may be utilized to determine the effects that each pixel corner and pixel may have on neighboring pixels. It should be appreciated that an image that may be rotated and projected from the FPA space to the projection plane may result from calculating the intersection location of the pixel corners and neighboring pixels. It should further be appreciated that the image may be based on the trajectory of the object and may be a stable image.

It should be appreciated that corrections may be applied to errors that may occur in the INS when calibrating one or more of the cameras inside of the object or with other dynamic effects acted upon the object. Correcting errors may align and smooth neighboring frames of the images. A Discrete Cosine Transform (DCT) and an edge detection filter (Sobel) may be applied to the projected image. By applying the DCT and Sobel, two images may be analyzed to identify objects and distinct features in which to apply refining rotations and make adjustments.

It should be appreciated that the DCT that may be calculated utilizing the following equation.

$$X_k = \sum_{n=0}^{N-1} X_n \cos\left[\frac{\pi}{N}\left(n + \frac{1}{2}\right)k\right] k = 0, \ldots \ldots N-1$$

It should be appreciated that the Sobel may provide the edge detection and may be calculated utilizing the following equation.

$$G_x = \begin{bmatrix} -1 & 0 & +1 \\ -2 & 0 & +2 \\ -1 & 0 & +1 \end{bmatrix} * A \quad G_y = \begin{bmatrix} +1 & +2 & +1 \\ 0 & 0 & 0 \\ -1 & -2 & -1 \end{bmatrix} * A$$

$$G = \sqrt{G_x + G_y} \text{ and } \theta = \tan^{-1}\left(\frac{G_x}{G_{xy}}\right)$$

It should be appreciated that features of the resulting DCT and Sobel results may be analyzed, ranked, and processed to provide orientation of the image. It should be appreciated that high ranking large features, such as long straight lines or other high-contrast items, may be ranked higher. For instance, line features may be given a vector assignment (direction and magnitude). Large items may be given a size and a centroid location. A minimum of three items generally may be needed before an item classifier or an object classifier function may complete classifying or ranking items. These three items may then be given a relative orientation (direction) and size and location and then stored for future processing.

Aligning and Adjusting Frames (Step 470)

According to an embodiment of the present disclosure, as depicted in FIG. 4, an image or the plurality of FPA frames may be adjusted and aligned with object 100 between neighboring frames in step 470. It should be appreciated that previously computed alignment and adjustment calculations may be applied to the neighboring frames in embodiments of the present disclosure. It should further be appreciated that items captured in previous frames may be compared to items of current frames in some embodiments of the present disclosure. The velocity, acceleration, and/or position of the previous frames and the current frames may indicate how the objects should have translated in the FoV in the plane projection. If the resulting objects are provided outside of a configurable limit, the rotation and plane projection algorithm may help to smooth the image by first applying a simple rotation to the projection plane image to more closely match the object. It should be appreciated that the amount of image rotation, such as, yaw-pitch-roll, may be a function of the acceleration and velocity vectors from the INS and known static offsets. It should further be appreciated that the static offsets may be X, Y, and Z position offsets from a sensor location to a camera bore-axis and chip location. It should also be appreciated that the static offsets may be determined using one or more calibration techniques and/or by moving object 100 along a known path.

It should be appreciated that a processed and aligned projection plane image may be grouped with other images and may be converted into a standard video format. It should be appreciated that the VPA may be designed to support output to various file formats, including but not limited to, an MPEG 4 or an AVI. It should be appreciated that the VPA may be provided to support export of the plane image directly as video output on an HDMI port. It should further be appreciated that output video data may be easily customized to fit needs of the broadcast entity.

According to an embodiment of the present disclosure, at least one video camera 110 may be permanently embedded within or on object 100. It should be appreciated that at least one video camera 110 may be selectively removable from object 100 and/or replaceable without departing from the present disclosure. It should be appreciated that object 100 may be a football. It should also be appreciated that object 100 may be other sports balls including, but not limited to, basketballs, tennis balls, baseballs, soccer balls, and volleyballs. It should further be appreciated that object 100 may be embedded in other moving objects including, but not limited to, a cap worn by a runner during a race and goggles worn by a swimmer during a swimming competition. There also may be other non-sports related uses of the system and method according to embodiments of the present disclosure.

It should be appreciated that at least one camera 110 embedded in object 100 may provide a real-time or near real-time view of a sporting event or game. It should be appreciated that the system and method may provide a delay in data to be broadcast without departing from the present disclosure. It should be appreciated that the system and method for stabilizing a data stream may provide a real-time or near real-time view that may provide a plurality of camera angles and may capture entire plays or critical moments during a sporting event including, but not limited to, an interception during a football game, determining whether a runner's knee is down before the referee calls a play dead during a football game, whether the football crossed the line to signal a touchdown, a foul during a basketball game, and scoring a goal during a soccer game. It should also be appreciated that sporting officials, such as referees, may benefit from viewing stabilized data streams including entire plays or critical moments, and as such, may more accurately make decisions regarding the game.

It should be appreciated that an audience's viewing experience may be enhanced and may provide a close-up view of a sporting event, such as the position of the ball in an athlete's hands or where the ball lands at the end of a play. It should further be appreciated that the system and method of stabilizing a data stream may provide a real-time or near real-time view of a sporting event that may provide all audiences with an enhanced viewing experience, whether the audience is watching the sporting event from stands in a stadium, on television, or on a computer.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A method of stabilizing a data stream from an in-flight object throughout a trajectory of the object, comprising:
   receiving the data stream of an action in an object imaging system from at least one video camera embedded in the object,
      wherein the data stream comprises at least:
         video data, focal plane array (FPA) data, and inertial navigation system (INS) data; and
      wherein at least one transceiver relays information to the object imaging system;
   processing the data stream in a video processing server (VPS),
      wherein a video processing application (VPA) orients the data stream with respect to a reference location, wherein the reference location is a centroid of a predetermined number of frames; and
   regenerating the data stream in the VPS, wherein an output video is stabilized and configured for broadcasting the action in a proper orientation.

2. The method of claim 1, wherein the at least one video camera is a high-speed device capable of capturing travel of fast-moving objects.

3. The method of claim 1, wherein the object imaging system has a wide angular field of view of approximately 88 degrees.

4. The method of claim 1, wherein the object imaging system is a football imaging system that provides a real-time or a near real-time data stream of the action, and wherein the action is at least a portion of a football game.

5. The method of claim 1, the processing step comprising:
   buffering the data stream;
   filtering the INS data;
   determining deviations between a plurality of positions of the object, the reference location, and at least one projection plane location;
   rotating a normalized pixel corner matrix of the at least one video camera about a bore sight axis of the at least one video camera, wherein a graphics processing unit or a field programmable gate array calculates a set of rotation matrix data;
   projecting a plurality of FPA frames onto the at least one projection plane location;
   applying at least one pixel to the at least one projection plane location; and
   aligning and adjusting the plurality of FPA frames.

6. The method of claim 5, wherein the reference location is a centroid of approximately 30 frames.

7. The method of claim 5, wherein the normalized pixel corner matrix is rotated within approximately five milliseconds.

8. The method of claim 5, the filtering step comprising:
   synchronizing the INS data and the FPA data.

9. The method of claim 8, further comprising:
   compressing frames of lossless compressed video relative to the synchronized INS data and FPA data.

10. A system for stabilizing a data stream from an in-flight object throughout a trajectory of the object, comprising:
    at least one video camera embedded in the object;
    an object imaging system provided to receive a data stream from the at least one video camera of an action, wherein the data stream comprises at least: video data, focal plane array (FPA) data, and inertial navigation system (INS) data;
    at least one transceiver provided to relay information to the object imaging system; and
    a video processing server (VPS) provided to process and regenerate the data stream,
       wherein a video processing application (VPA) orients the data stream with respect to a reference location, wherein the reference location is a centroid of a predetermined number of frames, and
       wherein an output video is stabilized and configured for broadcasting the action in a proper orientation.

11. The system of claim 10, wherein the object imaging system is a football imaging system that provides a real-time or a near real-time data stream of the action, and wherein the action is at least a portion of a football game or play.

12. The system of claim 10, wherein the object imaging system includes a battery configured to support the live broadcast of the output video throughout a time period of the live broadcast.

13. The system of claim 10, further comprising:
    a graphics processing unit or a field programmable gate array provided to calculate a set of rotation matrix data and rotate a normalized pixel corner matrix of the at least one video camera about a bore sight axis of the at least one video camera.

14. The system of claim 10, wherein the at least one video camera is a high-speed device capable of recording fast-moving objects.

15. The system of claim 10, wherein the object imaging system has a wide angular field of view of approximately 88 degrees.

* * * * *

UNITED STATES PATENT AND TRADEMARK OFFICE
CERTIFICATE OF CORRECTION

PATENT NO. : 9,736,375 B1
APPLICATION NO. : 15/044793
DATED : August 15, 2017
INVENTOR(S) : Pickett et al.

Page 1 of 1

It is certified that error appears in the above-identified patent and that said Letters Patent is hereby corrected as shown below:

On the Title Page

Item (12) "Pickett" should read -- Pickett, et al. --.

Item (75) Inventor is corrected to read:
-- David Pickett, Plano (TX);
John Lusher, Bryan (TX) --.

Signed and Sealed this
Seventh Day of August, 2018

Andrei Iancu
*Director of the United States Patent and Trademark Office*